(12) United States Patent
Nishimaki et al.

(10) Patent No.: US 12,090,644 B2
(45) Date of Patent: Sep. 17, 2024

(54) LINEAR MEMBER GRIPPING DEVICE

(71) Applicant: OMRON Corporation, Kyoto (JP)

(72) Inventors: Satoru Nishimaki, Kyoto (JP);
Takayuki Komaya, Kyoto (JP);
Nobumasa Miki, Kyoto (JP);
Kazumasa Seki, Kyoto (JP); Toshiaki Maeda, Kyoto (JP); Toshinori Tanaka, Kyoto (JP)

(73) Assignee: OMRON Corporation, Kyoto (JP)

( * ) Notice: Subject to any disclaimer, the term of this patent is extended or adjusted under 35 U.S.C. 154(b) by 379 days.

(21) Appl. No.: 17/634,550

(22) PCT Filed: Aug. 28, 2020

(86) PCT No.: PCT/JP2020/032590
§ 371 (c)(1),
(2) Date: Feb. 11, 2022

(87) PCT Pub. No.: WO2021/059863
PCT Pub. Date: Apr. 1, 2021

(65) Prior Publication Data
US 2022/0281122 A1    Sep. 8, 2022

(30) Foreign Application Priority Data

Sep. 25, 2019 (JP) .................... 2019-174677

(51) Int. Cl.
*B25J 15/08* (2006.01)
*B25J 9/16* (2006.01)

(52) U.S. Cl.
CPC ............ *B25J 15/08* (2013.01); *B25J 9/1612* (2013.01)

(58) Field of Classification Search
CPC ......... B25J 15/08; B25J 15/083; B25J 9/1612
USPC .......................... 294/86.4, 101, 102.1, 119.1
See application file for complete search history.

(56) References Cited

U.S. PATENT DOCUMENTS

| | | | | |
|---|---|---|---|---|
| 4,808,898 A | * | 2/1989 | Pearson ............. | G05B 19/4202 318/599 |
| 4,831,693 A | * | 5/1989 | Veith .................... | B42F 15/066 294/102.1 |
| 5,088,783 A | * | 2/1992 | Squires .................. | B66C 1/447 414/626 |

(Continued)

FOREIGN PATENT DOCUMENTS

| | | |
|---|---|---|
| CN | 203316650 | 12/2013 |
| CN | 206936224 | 1/2018 |

(Continued)

OTHER PUBLICATIONS

Office Action of China Counterpart Application, with English translation thereof, issued on Mar. 25, 2023, pp. 1-17.

(Continued)

*Primary Examiner* — Paul T Chin
(74) *Attorney, Agent, or Firm* — JCIPRNET

(57) ABSTRACT

A linear member gripping device includes: a first gripping member that abuts a linear member; a second gripping member that abuts the linear member and has a protrusion; a first drive part and a second drive part that change relative positions of the first and second gripping members; and a limitation part that limits movement of the linear member sandwiched between the first and second gripping members at a predetermined limitation position.

9 Claims, 11 Drawing Sheets

(56) References Cited

U.S. PATENT DOCUMENTS

| | | | | |
|---|---|---|---|---|
| 8,172,292 | B1* | 5/2012 | Andersen | B65B 25/046 |
| | | | | 294/2 |
| 8,915,527 | B2* | 12/2014 | Watanabe | B25J 15/08 |
| | | | | 294/99.1 |
| 9,277,686 | B2* | 3/2016 | Jia | B25B 1/106 |
| 11,247,346 | B2* | 2/2022 | Izumi | B25J 15/00 |
| 2015/0251321 | A1* | 9/2015 | Ishikawa | B25J 15/0047 |
| | | | | 294/183 |
| 2018/0169870 | A1 | 6/2018 | Nakayama | |
| 2018/0370044 | A1* | 12/2018 | Zitting | B25J 15/08 |
| 2019/0351549 | A1* | 11/2019 | Suzuki | B25J 9/1697 |
| 2019/0351562 | A1* | 11/2019 | Iwazaki | B25J 15/08 |

FOREIGN PATENT DOCUMENTS

| | | |
|---|---|---|
| CN | 108526833 | 9/2018 |
| JP | H0475916 | 3/1992 |
| JP | 2011115914 | 6/2011 |
| JP | 2013202649 | 10/2013 |
| JP | 2018094704 | 6/2018 |

OTHER PUBLICATIONS

"International Search Report (Form PCT/ISA/210) of PCT/JP2020/032590," mailed on Nov. 2, 2020, with English translation thereof, pp. 1-4.

"Written Opinion of the International Searching Authority (Form PCT/ISA/237) of PPCT/JP2020/032590," mailed on Nov. 2, 2020, with English translation thereof, pp. 1-8.

* cited by examiner

LINEAR MEMBER GRIPPING DEVICE

CROSS-REFERENCE TO RELATED APPLICATION

This application is a 371 application of the International PCT application serial no. PCT/JP2020/032590, filed on Aug. 28, 2020, which claims the priority benefit of Japan Patent Application No. 2019-174677, filed on Sep. 25, 2019. The entirety of each of the above-mentioned patent applications is hereby incorporated by reference herein and made a part of this specification.

TECHNICAL FIELD

The present invention relates to a linear member gripping device.

RELATED ART

Linear members such as lead wires obtained after various processes are collected to form a linear member assembly. After that, the linear members are separated one by one from the linear member assembly, and the linear members after separation are sequentially supplied to a subsequent processing process.

As a technique for separating the linear members one by one from the linear member assembly, for example, Patent Document 1 describes a wire supply device as follows. The wire supply device includes an accommodation part accommodating a wire, a gripping part gripping and moving the wire, and a movable part displacing the accommodation part. The accommodation part has a first accommodation piece and a second accommodation piece facing each other with the wire as a boundary. A deviation gap between the two accommodation pieces is reduced as approaching one direction side, and an opening is provided on the one direction side. The gripping part has a first gripping piece and a second gripping piece facing each other. A deviation gap between the two gripping pieces is reduced as approaching one direction side, and the wire exposed from the opening is gripped by being accommodated in the deviation gap. The movable part displaces the accommodation part so as to deviate the opening from the gripping part.

PRIOR-ART DOCUMENTS

Patent Documents

Patent Document 1: Japanese Patent Publication "Japanese Patent Laid-open No. 2013-202649 (published on Oct. 7, 2013)"

SUMMARY OF THE INVENTION

Problems to be Solved by the Invention

In the above-mentioned conventional technique, the gripping part is moved toward the opening, and the wire is sandwiched in the deviation gap between the two gripping pieces of the gripping part. The gripping part has a structure in which the deviation gap between the two gripping pieces is reduced toward a side close to the roots of the two gripping pieces and is increased toward a side opposite the roots of the two gripping pieces. Since the two gripping pieces have the structure, among multiple wires accommodated in the accommodation part and exposed from the opening, there is a risk that it may not be possible to grip a single wire in the deviation gap between the two gripping pieces and multiple wires may be gripped. Therefore, there has been a demand for a device capable of reliably gripping a single wire.

One aspect of the present invention realizes a device capable of reliably gripping a single linear member.

Means for Solving the Problems

In order to solve the aforementioned problems, a linear member gripping device according to one aspect of the present invention includes: a first gripping member, having a first gripping surface that abuts a linear member to be gripped; a second gripping member, having a second gripping surface that abuts the linear member and faces the first gripping surface, and having a protrusion protruding toward the first gripping surface from the second gripping surface; a first drive part, changing relative positions of the first gripping member and the second gripping member in a first direction being a direction in which the first gripping member and the second gripping member approach or depart from each other, and a second drive part, changing the relative positions of the first gripping member and the second gripping member in a second direction perpendicular to the first direction; and a limitation part, limiting movement of the linear member sandwiched between the first gripping member and the second gripping member toward the second direction at a predetermined limitation position.

Effects of the Invention

According to one aspect of the present invention, a device is realized capable of reliably gripping a single linear member.

DESCRIPTION OF THE EMBODIMENTS

An embodiment (hereinafter also written as "the present embodiment") according to one aspect of the present invention is hereinafter described based on the drawings.

§ 1 Application Example

Figure 1:
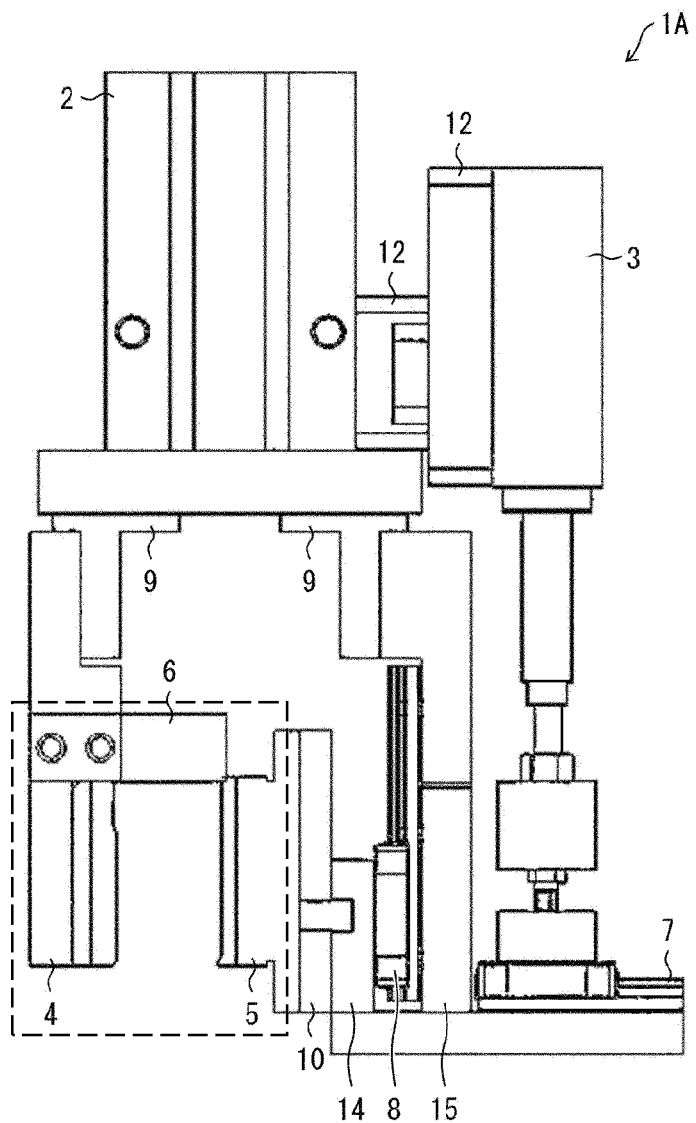
FIG. 1 is a front view illustrating one example of a linear member gripping device according to one embodiment of the present invention.
Figure 2:
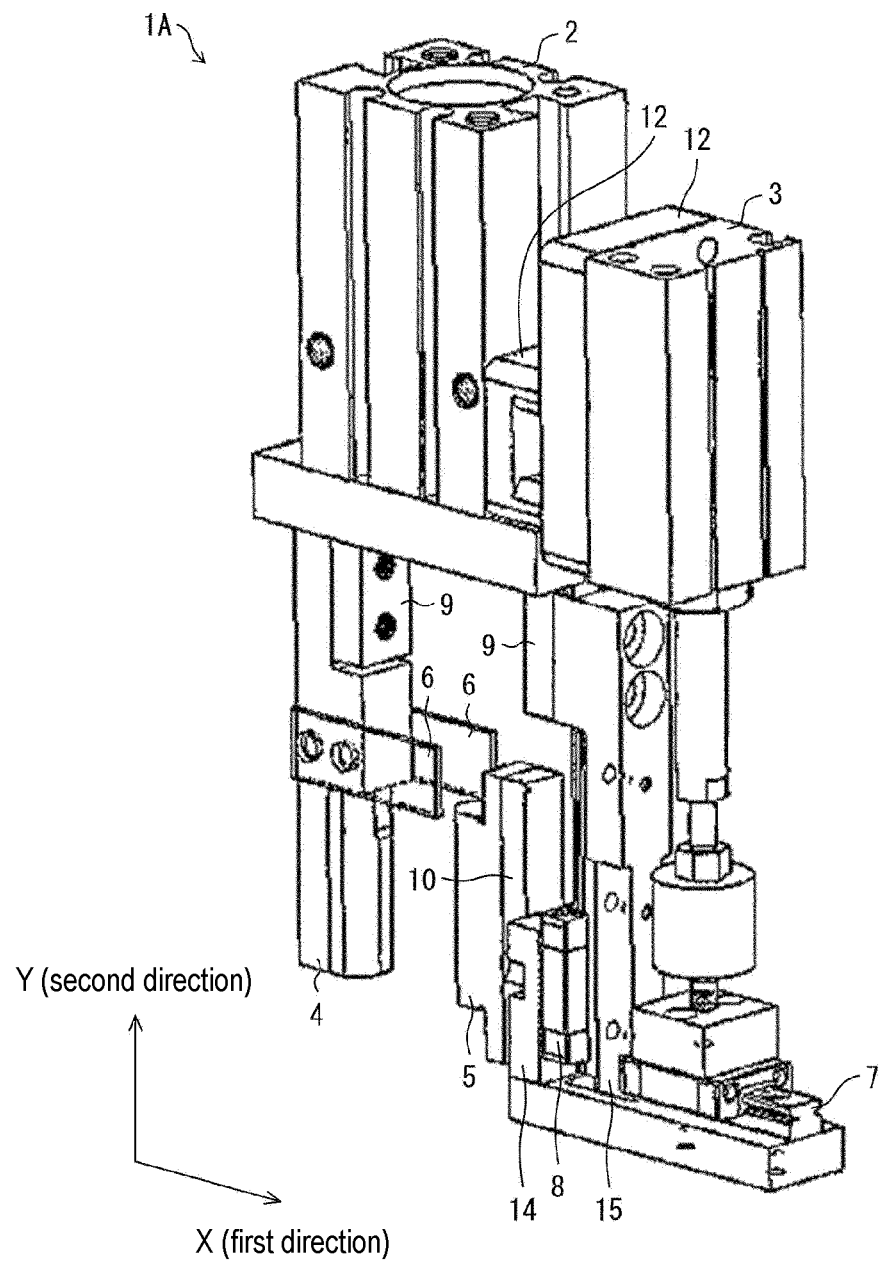
FIG. 2 is a side view illustrating one example of a linear member gripping device according to one embodiment of the present invention.

A linear member gripping device in a scene to which the present invention is applied is described with reference to FIG. 1 and FIG. 2. FIG. 1 is a front view illustrating one example of a linear member gripping device according to the present embodiment. FIG. 2 is a side view illustrating one example of a linear member gripping device according to the present embodiment.

In the present specification, the term "linear member gripping device" means a device that grips, one by one, multiple linear members obtained after various processings and supplied as an assembly. In the present embodiment, a lead wire as an electric wire is assumed as a linear member. However, any kind of linear member may be used.

A linear member gripping device according to the present embodiment is described as follows based on FIG. 1 and FIG. 2. A linear member gripping device 1A according to the present embodiment includes a first drive part 2, a second drive part 3, a first gripping member 4, a second gripping member 5, and a limitation part 6.

Figure 4:
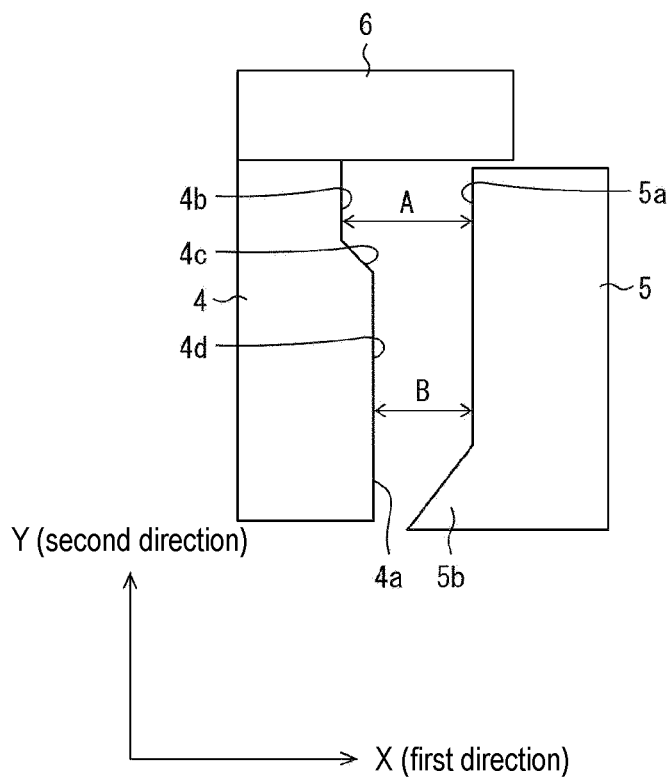
FIG. 4 is an enlarged view illustrating the inside of a dotted line frame in FIG. 1.

The first gripping member 4 and the second gripping member 5 abut the linear member and grip the linear member. As illustrated in FIG. 4, the first drive part 2 changes relative positions of the first gripping member 4 and the second gripping member 5 in a first direction being a direction in which the first gripping member 4 and the second gripping member 5 approach or depart from each other. In this example, the first direction is a direction perpendicular to a first gripping surface 4a and a second gripping surface 5a. The second drive part 3 changes the relative positions of the first gripping member 4 and the second gripping member 5 in a second direction perpendicular to the first direction. In this example, the second direction is a direction parallel to the first gripping surface 4a and the second gripping surface 5a. The first gripping surface 4a and the second gripping surface 5a do not have to be disposed completely parallel to each other, and may face each other while deviating by a predetermined angle from the parallel state within an allowable range. The first direction and the second direction do not have to be completely perpendicular to each other, and may have an angle deviating by a predetermined angle from the perpendicular state within an allowable range.

After the first gripping member 4 and the second gripping member 5 driven by the first drive part 2 and the second drive part 3 have gripped multiple linear members, by further driving each gripping member by each drive part, one of the multiple linear members can be gripped by the first gripping member 4, the second gripping member 5, and the limitation part 6.

§ 2 Configuration Example

[Configuration Example of Linear Member Gripping Device]

One example of a linear member gripping device according to the present embodiment is described with reference to FIG. 1, FIG. 2 and FIG. 4. Here, FIG. 4 is an enlarged view illustrating the inside of a dotted line frame in FIG. 1.

In the example of FIG. 1 and FIG. 2, the linear member gripping device 1A according to the present embodiment includes the first drive part 2, the second drive part 3, the first gripping member 4, the second gripping member 5, the limitation part 6, a first sliding part 7 and a second sliding part 8.

The first gripping member 4 has the first gripping surface 4a that abuts the linear member to be gripped. The second gripping member 5 has the second gripping surface 5a facing the first gripping surface 4a, and has a protrusion 5b protruding toward the first gripping surface 4a from the second gripping surface 5a.

On the first gripping surface 4a, a root side gripping surface 4b, a tip side gripping surface 4d, and a step surface 4c connecting the root side gripping surface 4b and the tip side gripping surface 4d are formed in order in a vertically downward direction. A distance A between the root side gripping surface 4b and the second gripping surface 5a is larger than a distance B between the tip side gripping surface 4d and the second gripping surface 5a.

The first drive part 2 changes the relative positions of the first gripping member 4 and the second gripping member 5 in the first direction X perpendicular to the first gripping surface 4a and the second gripping surface 5a. The second drive part 3 changes the relative positions of the first gripping member 4 and the second gripping member 5 in the second direction Y parallel to the first gripping surface 4a and the second gripping surface 5a.

The limitation part 6 limits movement of the linear member gripped between the first gripping member 4 and the second gripping member 5 toward the second direction Y at a predetermined limitation position (described later).

The first sliding part 7 is a guide member for moving the relative positions of the first gripping member 4 and the second gripping member 5 toward the first direction X. The second sliding part 8 is a guide member for moving the relative positions of the first gripping member 4 and the second gripping member 5 toward the second direction Y.

Figure 5:
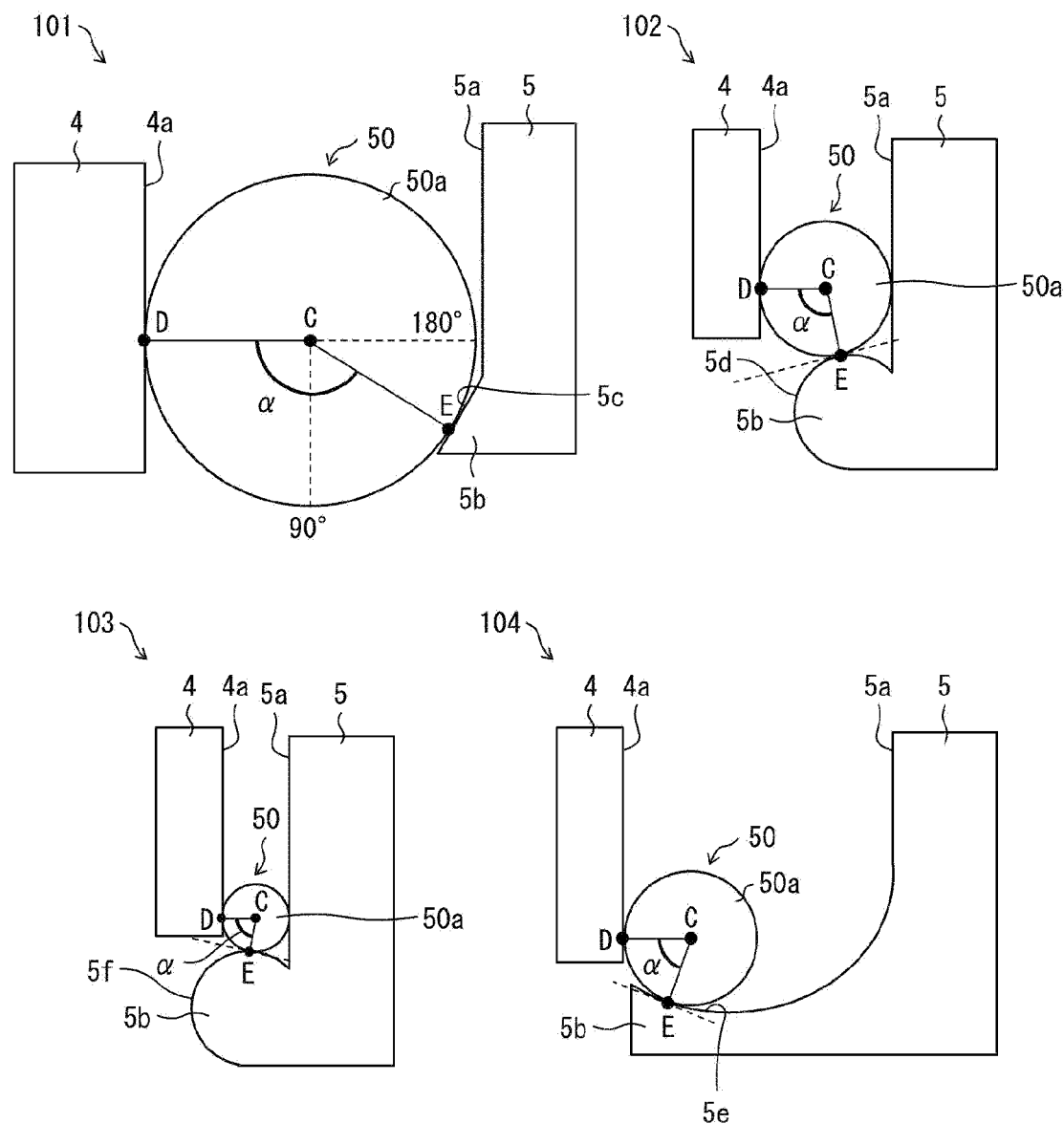
FIG. 5 is a schematic view illustrating an example of the shape of a protrusion of a linear member gripping device according to one embodiment of the present invention.

Here, the shape of the protrusion 5b is described below. FIG. 5 is a schematic view illustrating an example of the shape of the protrusion 5b of a linear member gripping device according to the present embodiment. As illustrated in sign 101 of FIG. 5, the protrusion 5b has a shape as follows. When a linear member 50 contacts the first gripping surface 4a and the protrusion 5b (protruding surface 5c), a straight line from a center point C in a section 50a of the linear member 50 to a contact point D between the first gripping surface 4a and the linear member 50 and a straight line from the center point C to a contact point E between the protrusion 5b (protruding surface 5c) and the linear member 50 form an angle α greater than 90 degrees and less than 180 degrees.

The shape of the protrusion 5b is not particularly limited if the angle α is greater than 90 degrees and less than 180 degrees when the linear member 50 contacts the first gripping surface 4a and the protrusion 5b. Examples of the shape of the protrusion 5b may include a shape like a protrusion (protruding surface 5d) illustrated in sign 102 of FIG. 5 in which a sectional shape of the protrusion is substantially partially circular. In other words, the shape of the protrusion is not limited if the shape is not a shape (for example, a shape in which the linear member 50 is likely to contact at a position on a protruding surface like protruding surfaces 5f and 5e whose normal direction is inclined toward the second gripping surface 5a rather than the vertical direction) in which the angle α may be 90 degrees or less, as illustrated in signs 103 and 104 of FIG. 5. In consideration of the above relationship, the shape of the protrusion is appropriately determined according to the size of the major axis of the section 50a (or the type of the linear member 50).

Figure 6:
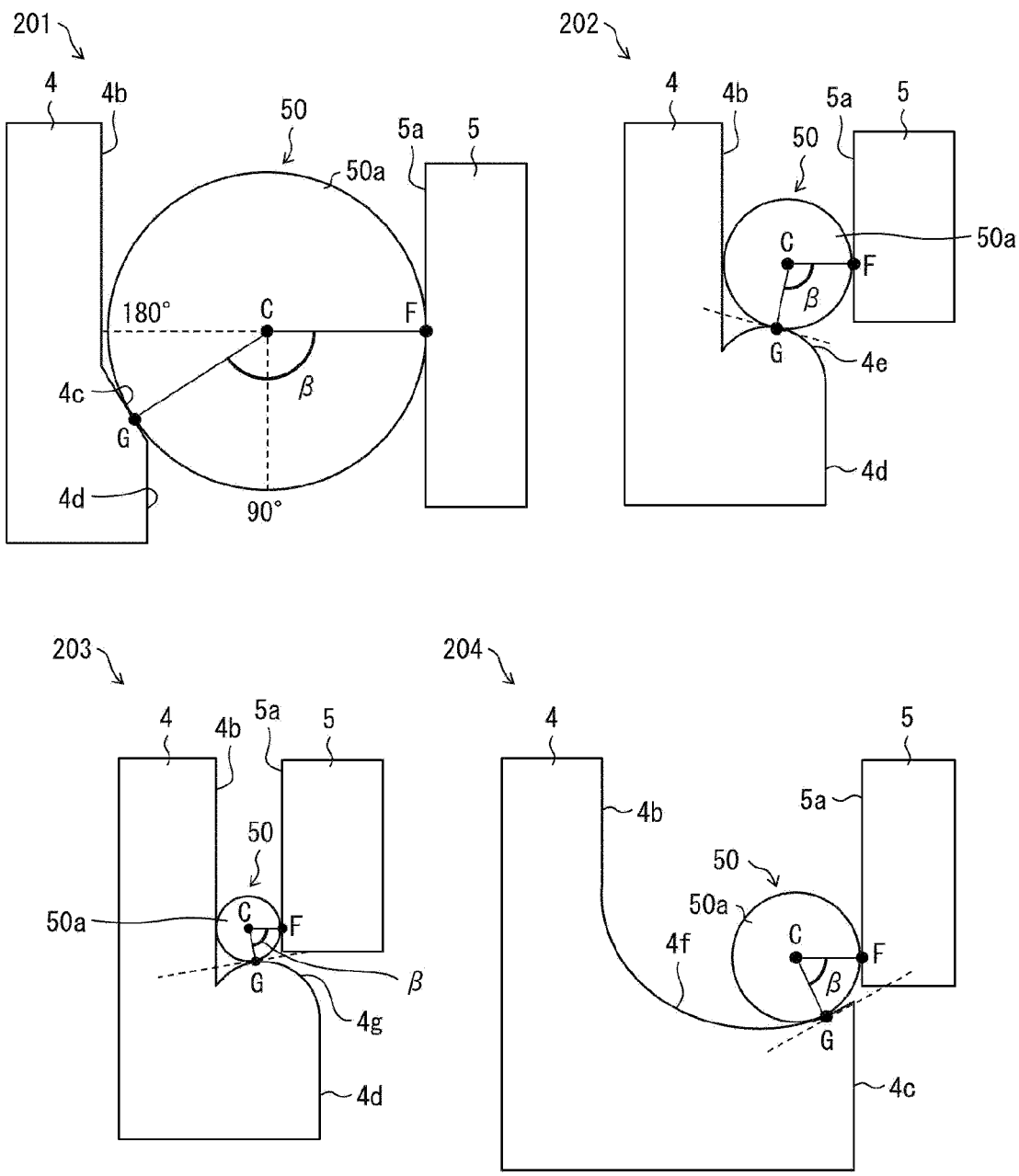
FIG. 6 is a schematic view illustrating an example of the shape of a step surface of a linear member gripping device according to one embodiment of the present invention.

The shape of the step surface 4c is described below. FIG. 6 is a schematic view illustrating an example of the shape of the step surface 4c of a linear member gripping device according to the present embodiment. The step surface 4c has a shape as follows. As illustrated in sign 201 of FIG. 6, when the linear member 50 contacts the second gripping surface 5a and the step surface 4c, a straight line from the center point C in the section 50a of the linear member 50 to a contact point F between the second gripping surface 5a and the linear member 50 and a straight line from the center point C to a contact point G between the step surface 4c and the linear member 50 form an angle β greater than 90 degrees and less than 180 degrees.

The shape of the step surface 4c is not particularly limited if the angle β is greater than 90 degrees and less than 180 degrees when the linear member 50 contacts the second gripping surface 5a and the step surface 4c. Examples of the shape of the step surface 4c may include, for example, a shape like a step surface 4e illustrated in sign 202 of FIG. 6 in which a sectional shape of the step surface draws an arc. In other words, the shape of the step surface is not limited if the shape is not a shape (for example, a shape in which the linear member 50 is likely to contact at a position on a step surface like step surfaces 4g and 4f whose normal direction is inclined toward the root side gripping surface 4b rather than the vertical direction) in which the angle β may be 90 degrees or less, as illustrated in signs 203 and 204 of FIG. 6. In consideration of the above relationship, the shape of the step surface is appropriately determined according to the size of the major axis of the section 50a (or the type of the linear member 50).

The first drive part 2, the second drive part 3, the first gripping member 4, the second gripping member 5, the first sliding part 7, and the second sliding part 8 are connected via each structural member (for example, structural members 9, 10, 12, 14 and 15). The limitation part 6 is provided, for example, on the root side of the root side gripping surface 4b in the first gripping member 4.

[Example of Functional Block of Control Part Included in Linear Member Gripping Device]

Figure 3:
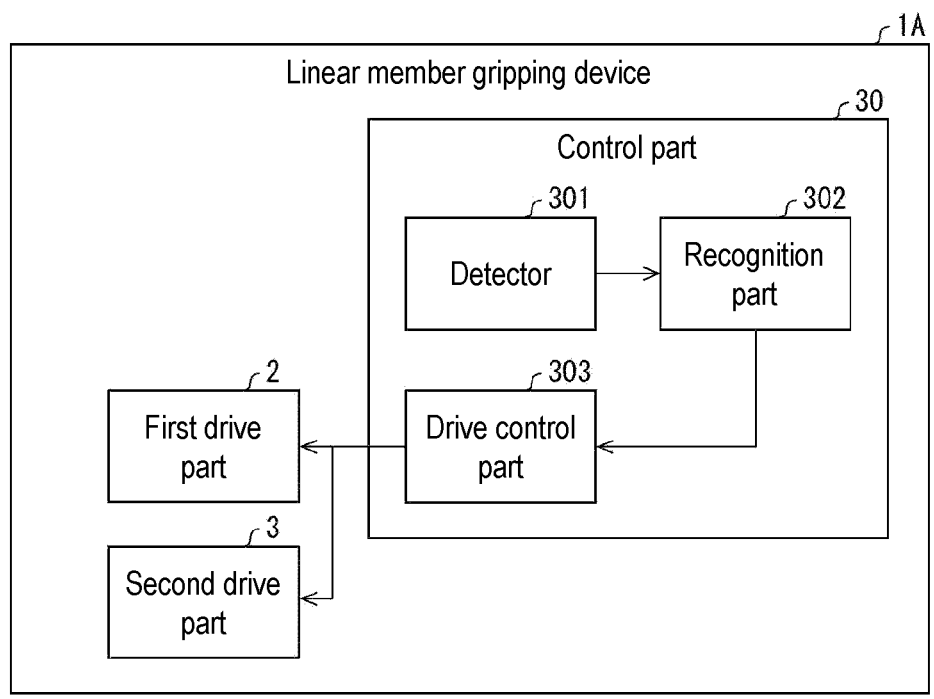
FIG. 3 is a block view illustrating one example of a functional block of a control part included in a linear member gripping device according to one embodiment of the present invention.

One example of a functional block of a control part included in a linear member gripping device according to the present embodiment is described with reference to FIG. 3. FIG. 3 is a block view illustrating one example of a functional block of a control part included in the linear member gripping device 1A.

In the example of FIG. 3, the linear member gripping device 1A according to the present embodiment includes a control part 30. The control part 30 includes a central processing unit (CPU), a random access memory (RAM), a read only memory (ROM) or the like, and controls each component according to information processing.

The control part 30 includes a detector 301, a recognition part 302 and a drive control part 303. The detector 301 is a functional block detecting a distance (for example, the distance A or the distance B in FIG. 4) between the first gripping surface 4a and the second gripping surface 5a (or the protruding surface 5c). The recognition part 302 is a functional block recognizing the number of the linear member gripped by the first gripping surface 4a and the second gripping surface 5a based on the distance detected. The detector 301 and the recognition part 302 may be configured to be provided in an external control device connected to the linear member gripping device 1A via a communication network. Examples of the external control device include a programmable logic controller (PLC) or an industrial PC (IPC).

The drive control part 303 is a functional block driving the first drive part 2 and the second drive part 3. The drive control part 303 controls driving and stop of the first drive part 2 and the second drive part 3 in response to the processing of the detector 301 and the recognition part 302.

§ 3 Operation Example

Figure 7:
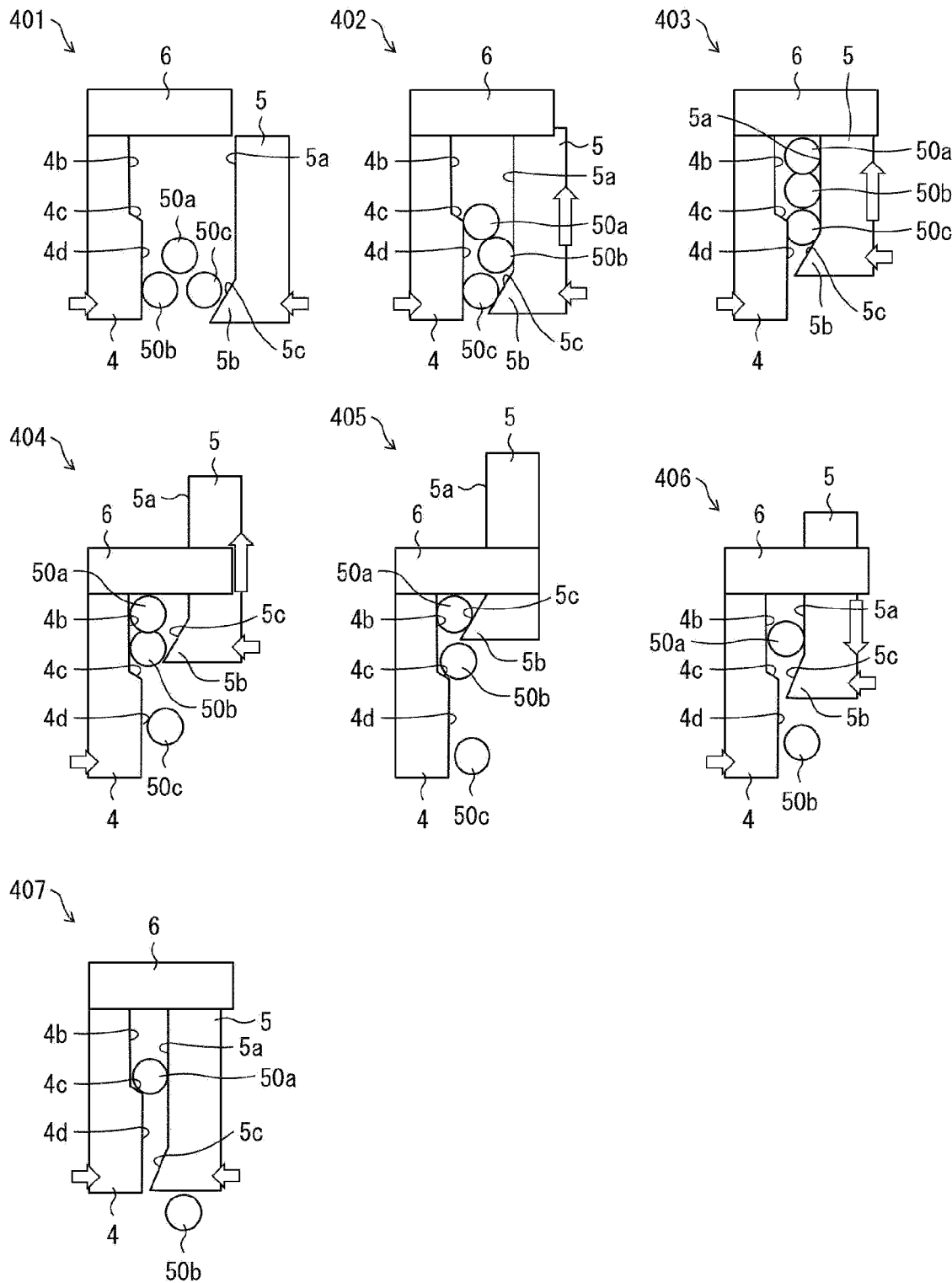
FIG. 7 is a schematic view illustrating a flow of a series of operations of a linear member gripping device according to one embodiment of the present invention.

An operation example of a linear member gripping device according to the present embodiment is described with reference to FIG. 7. FIG. 7 is a schematic view illustrating a flow of a series of operations of the linear member gripping device 1A according to the present embodiment. For convenience of description, FIG. 7 illustrates only a configuration within the dotted line frame in FIG. 1. In FIG. 7, a horizontal direction being a left-right direction as viewed toward the drawing sheet is taken as the first direction X, and a vertical direction being an up-down direction as viewed toward the drawing sheet is taken as the second direction Y.

First, multiple linear members obtained after various processings are collected. When the collected linear members are supplied to the linear member gripping device 1A, the first gripping member 4 and the second gripping member 5 are driven by the first drive part 2 toward the first direction X so that the relative positions of the first gripping member 4 and the second gripping member 5 are brought close to each other. Accordingly, multiple linear members (sections 50a, 50b and 50c) are gripped (sign 401).

When the multiple linear members are gripped by the two gripping members, by applying a gripping force toward the first direction X to the two gripping members by drive of the first drive part 2, the relative positions of the first gripping member 4 and the second gripping member 5 are brought closer to each other. The second gripping member 5 is driven vertically upward by the second drive part 3 so that the protrusion 5b approaches the vicinity (hereinafter referred to as a limitation position) of the limitation part 6 (signs 402 and 403). By rubbing the multiple linear members together between the first gripping member 4 and the second gripping member 5, the multiple linear members are arranged in a line toward the second direction Y. The multiple linear members gripped between the first gripping member 4 and the second gripping member 5 move vertically upward while rolling on the second gripping surface 5a as the second gripping member 5 moves vertically upward. During the movement, vertically downward movement of the linear member (section 50c) is limited by the protrusion 5b. Accordingly, the multiple linear members gripped by the two gripping members move upward without being released.

When the multiple linear members continue to move upward, among the multiple linear members arranged in a line, the linear member (section 50a) closest to the limitation part 6 reaches the vicinity (limitation position) of an abutting surface 6a of the limitation part 6. Due to a balance between movement of the vertically upward driven second gripping member 5 toward the second direction Y and gripping force of the first gripping member 4 and the second gripping member 5 generated toward the first direction X, a distance between the two gripping members is widened, and the linear members (sections 50b and 50c) are released one by one vertically downward from the two gripping members (signs 404 and 405). At this time, upward movement of the second gripping member 5 is stopped by the drive control part so that the length of the second gripping surface 5a is reserved to the extent that one linear member is sandwiched between the two gripping members. Hence, only one linear member is left between the two gripping members.

After only one linear member is left between the two gripping members, the relative positions of the first gripping member 4 and the second gripping member 5 are driven vertically downward so that the protrusion 5b departs from the limitation position. Specifically, the second gripping member 5 is driven and returns to the original position (the position of the second gripping member 5 illustrated in sign 401) before driving (signs 406 and 407). At this time, the section 50a gripped between the two gripping members moves vertically downward while rolling on the second gripping surface 5a as the second gripping member 5 is driven toward the second direction Y. The section 50a that has moved vertically downward contacts the step surface 4c. By fitting the linear member (section 50a) to the step surface 4c, the root side gripping surface 4b and the second gripping surface 5a, vertically downward movement of the section 50a is limited.

After the second drive part 3 has driven the relative positions of the first gripping member 4 and the second gripping member 5 in the direction in which the protrusion 5b departs from the limitation position, the first gripping member 4 and the second gripping member 5 gripping the linear member (section 50a) are driven so that the first gripping member 4 and the second gripping member 5 gripping the linear member move toward a direction (upward direction) of the root side in the second direction Y. By this movement, the linear member (section 50a) is pulled to an upper part of the linear member gripping device 1A.

In a series of operations from sign 401 to sign 407, basically, only one linear member is gripped. However, there may be a situation where the possibility that two or more linear members remain is not zero. In this case, for example, if the steps from sign 403 to sign 407 are executed twice, the possibility that two or more linear members remain can be made almost zero.

Figure 12:
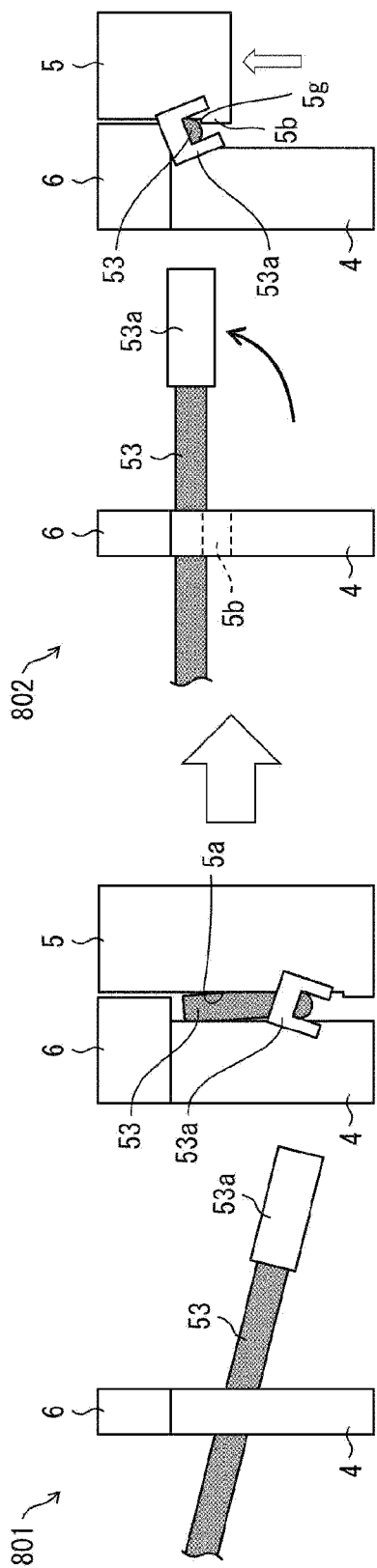
FIG. 12 is a schematic view illustrating a state in which one linear member provided with a terminal member is gripped according to an operation example of a linear member gripping device according to one embodiment of the present invention.

In the following, an example of a state in which one linear member is gripped according to an operation example according to the present embodiment is described with reference to FIG. 12. FIG. 12 is a schematic view illustrating a state in which one linear member 53 provided with a terminal member 53a is gripped according to an operation example of a linear member gripping device according to the present embodiment. The left figures of signs 801 and 802 illustrate side views of the first gripping member 4 as viewed from a direction perpendicular to an extension direction of a linear member when the linear member is being gripped. The right figures of signs 801 and 802 illustrate front views of the first gripping member 4 and the second gripping member 5 as viewed from the extension direction of the linear member when the linear member is being gripped.

As illustrated in sign 801 of FIG. 12, first, by sandwiching one linear member 53 by the first gripping member 4 and the second gripping member 5 from the left-right direction, inclination of the linear member 53 in the left-right direction is eliminated. After the one linear member 53 has been sandwiched by the first gripping member 4 and the second gripping member 5, as illustrated in sign 802 of FIG. 12, the sandwiched linear member 53 is lifted to the limitation part 6 (not illustrated), thereby eliminating the inclination of the linear member 53 in the up-down direction.

Here, in the linear member gripping device 1A according to the present embodiment, as illustrated in sign 802 of FIG. 12, the linear member 53 is gripped by a protruding surface 5g of the protrusion 5b and the abutting surface 6a (not illustrated) of the limitation part 6. Accordingly, the linear member 53 can be gripped so as to be parallel to a substantially horizontal direction.

An example of a state in which one linear member is gripped according to an operation example according to the present embodiment is described below with reference to FIG. 8. The left figures of signs 501 to 503 illustrate side views of the first gripping member 4 as viewed from a direction perpendicular to an extension direction of a linear member when the linear member is being gripped. The right figures of signs 501 and 503 illustrate front views of the first gripping member 4 and the second gripping member 5 as viewed from the extension direction of the linear member when the linear member is being gripped.

Figure 8:
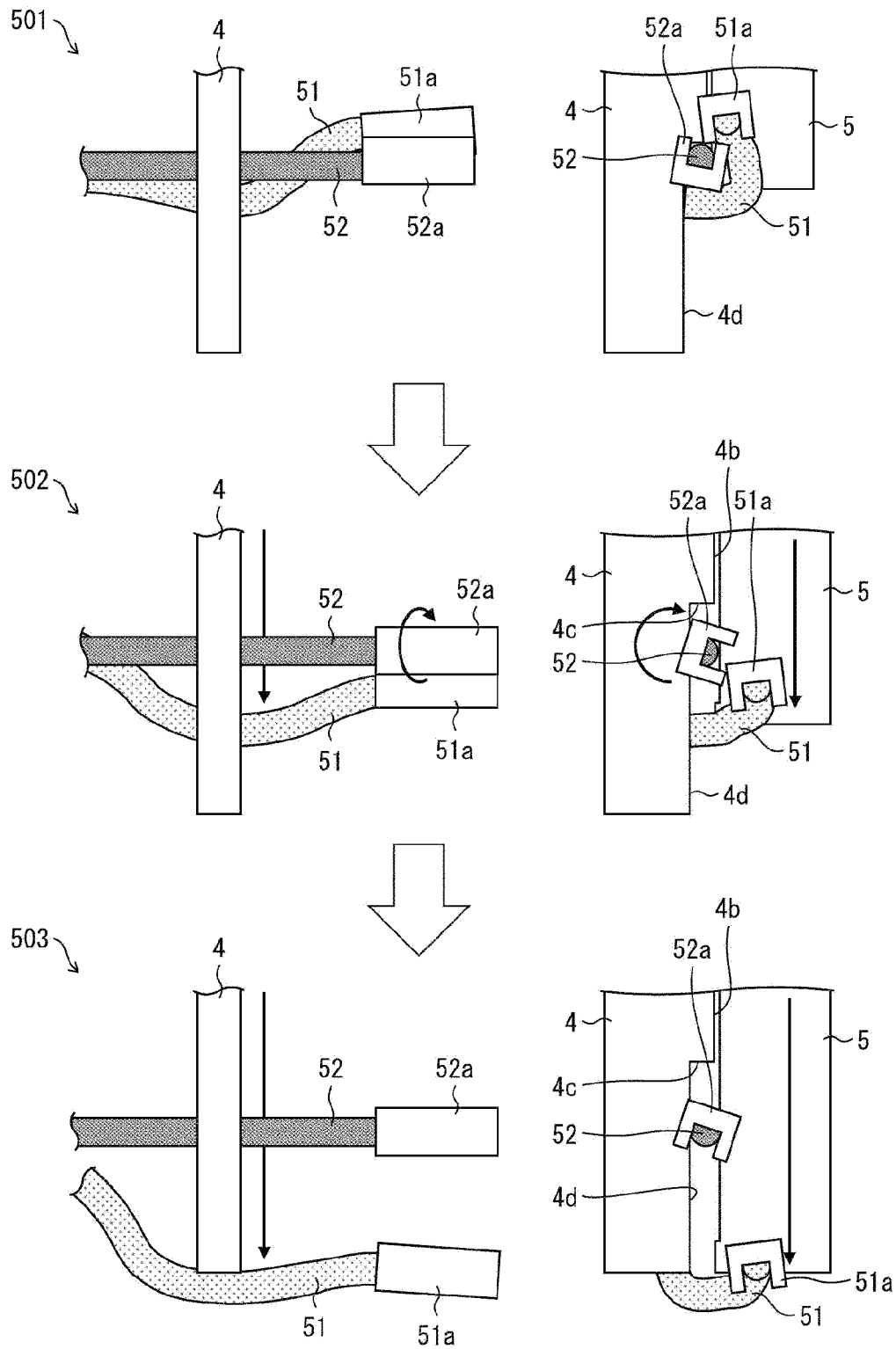
FIG. 8 is a schematic view illustrating a state in which one linear member is gripped according to an operation example of a linear member gripping device according to one embodiment of the present invention.

In the case where various members (such as, for example, terminal members 51a and 52a) are connected to an end of the linear member to be gripped as illustrated in FIG. 8, since the members are hooked to each other as illustrated in sign 501, the linear members may get entangled with each other.

In contrast, in the linear member gripping device 1A according to the present embodiment, the above entanglement of linear members can be released by the following operation. First, as illustrated in sign 502, the second gripping member 5 is driven vertically downward. As the second gripping member 5 moves vertically downward, a linear member 51 in contact with the second gripping surface 5a rotates and moves vertically downward. Due to the movement, a linear member 52 also rotates, and accordingly, the terminal member 52a also rotates. Hence, the hooking between the terminal member 51a and the terminal member 52a is released, and the linear member 51 and the linear member 52 are disentangled (sign 503).

After that, the second gripping member 5 is driven vertically downward. Since the linear member 52 moves vertically downward as the second gripping member 5 is driven, the linear member 52 is released from the two gripping members (sign 503).

In the operation example illustrated in FIG. 7, in the case where no linear member is left between the two gripping members by the series of operations from sign 401 to sign 405, by performing the series of operations from sign 401 to sign 405 again, it is possible to leave only one linear member between the two gripping members.

The number of the linear member gripped by the two gripping members by the series of operations from sign 401 to sign 405 is recognized as follows. The detector 301 detects the distance between the first gripping surface 4a and the second gripping surface 5a, and based on the distance detected, the recognition part 302 recognizes the number of the linear member gripped by the first gripping surface 4a and the second gripping surface 5a. Here, described below is one example of a method for detecting the number of the linear member and recognition of the number of the linear member in an operation example of a linear member gripping device according to the present embodiment.

Figure 9:
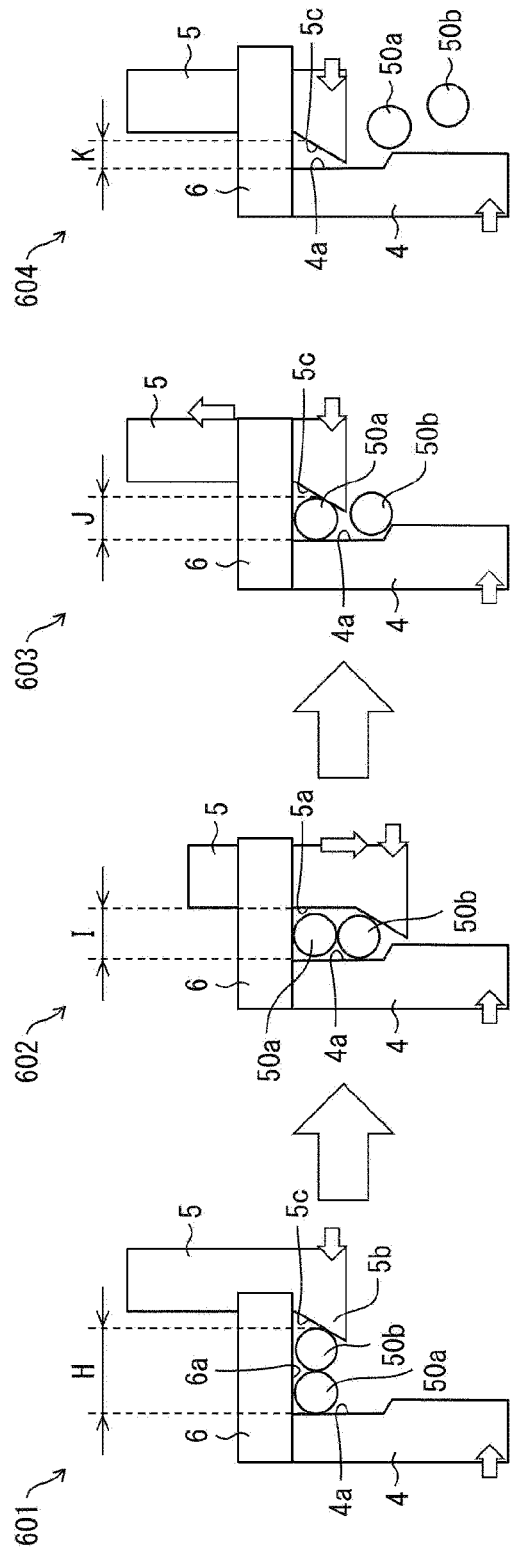
FIG. 9 is a schematic view illustrating one example of a method for detecting the number of linear members in an operation example of a linear member gripping device according to one embodiment of the present invention.

FIG. 9 is a schematic view illustrating one example of a method for detecting the number of linear members in an operation example of the linear member gripping device 1A according to the present embodiment. As illustrated in signs 601 to 604 of FIG. 9, the detector 301 detects a distance I between the first gripping surface 4a and the second gripping surface 5a, or distances H, J and K between the first gripping surface 4a and the protruding surface 5c.

Based on the distance detected by the detector 301, the recognition part 302 recognizes the number of the linear member gripped by the first gripping surface 4a and the second gripping surface 5a (protruding surface 5c). For example, if the detector 301 detects that the distance is the distance H, the recognition part 302 recognizes that two linear members are being gripped. If the detector 301 detects that the distance is the distance I or the distance J, the recognition part 302 recognizes that one linear member is being gripped. If the detector 301 detects that the distance is the distance K, the recognition part 302 recognizes that no linear member is being gripped. According to the number of the linear member recognized by the recognition part 302, it is determined whether the gripping operation has succeeded or failed, and the following controls are performed. If it has succeeded, a transfer operation of the linear member is performed; if it has failed, the gripping operation is performed again.

A device that enables the detection of each distance by the detector 301 is not particularly limited. For example, there may be mentioned a configuration in which a sensing result by a proximity sensor or a ray sensor is transmitted to the detector 301, and a configuration in which an encoder output or a cylinder sensor output of a drive motor that changes the relative positions of the first gripping member 4 and the second gripping member 5 in an X direction is transmitted to the detector 301.

In the above example, the recognition part 302 recognizes the number of the linear member gripped based on the distance detected by the detector 301. However, an output from a sensor capable of directly detecting the number of the linear member may be used. For example, a sensing result by a proximity sensor or a photoelectric sensor may be transmitted to the recognition part 302, and the recognition part 302 may directly recognize the number of the linear member from the sensing result.

§ 4 Modifications

The embodiments of the present invention have been described in detail as above. However, the above description is merely an example of the present invention in all respects. It goes without saying that various improvements or modifications can be made without departing from the scope of the present invention. For instance, the following changes are possible. In the following, the same components as those in the above embodiments are denoted by the same reference numerals, and description of the same points as those in the above embodiments are omitted as appropriate. The following modifications may be combined as appropriate.

Figure 10:
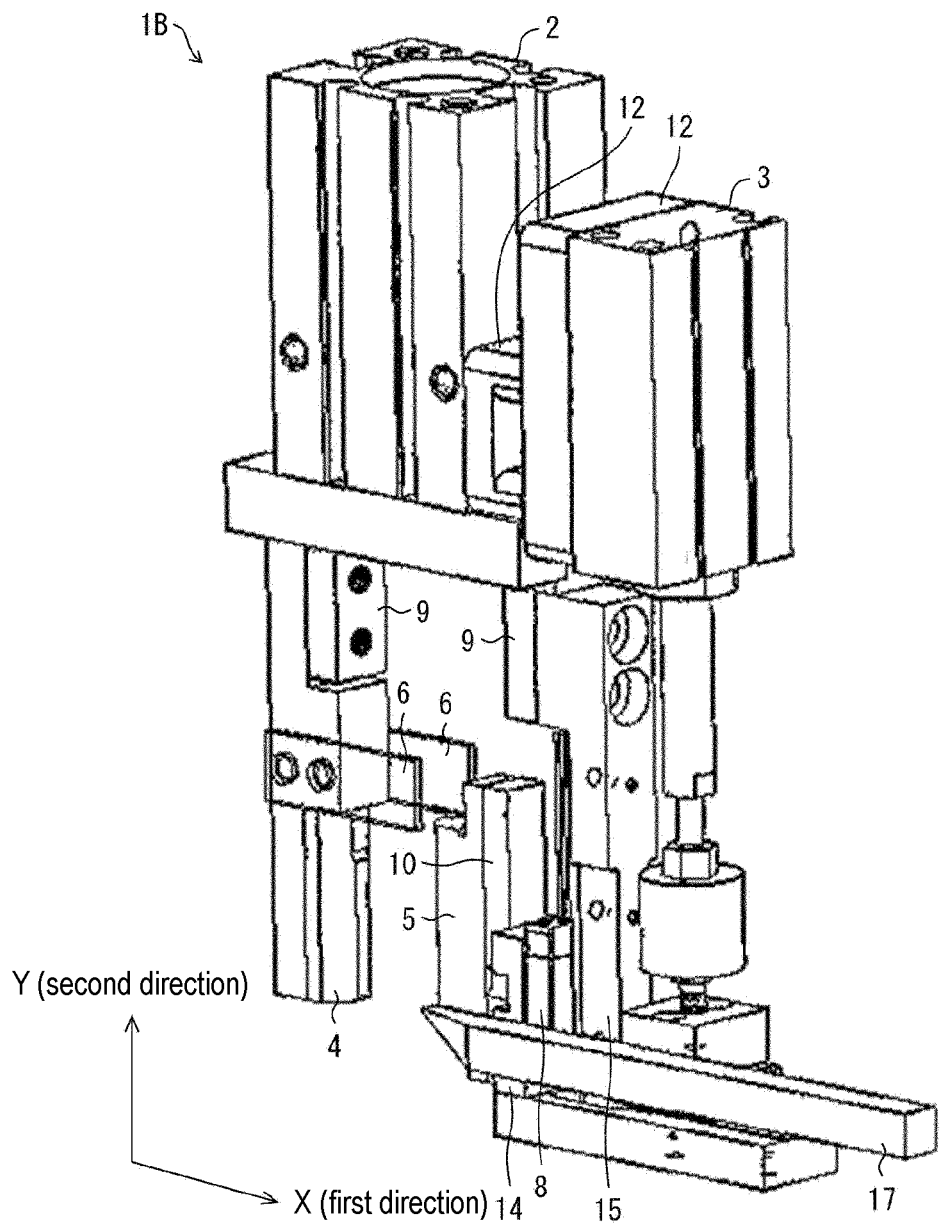
FIG. 10 is a side view illustrating another example of a linear member gripping device according to one embodiment of the present invention.

FIG. 10 is a side view illustrating another example of a linear member gripping device according to the present embodiment. A linear member gripping device 1B may include, in addition to the configuration provided in the linear member gripping device 1A described in § 2, an insertion member 17, as illustrated in FIG. 10.

Figure 11:
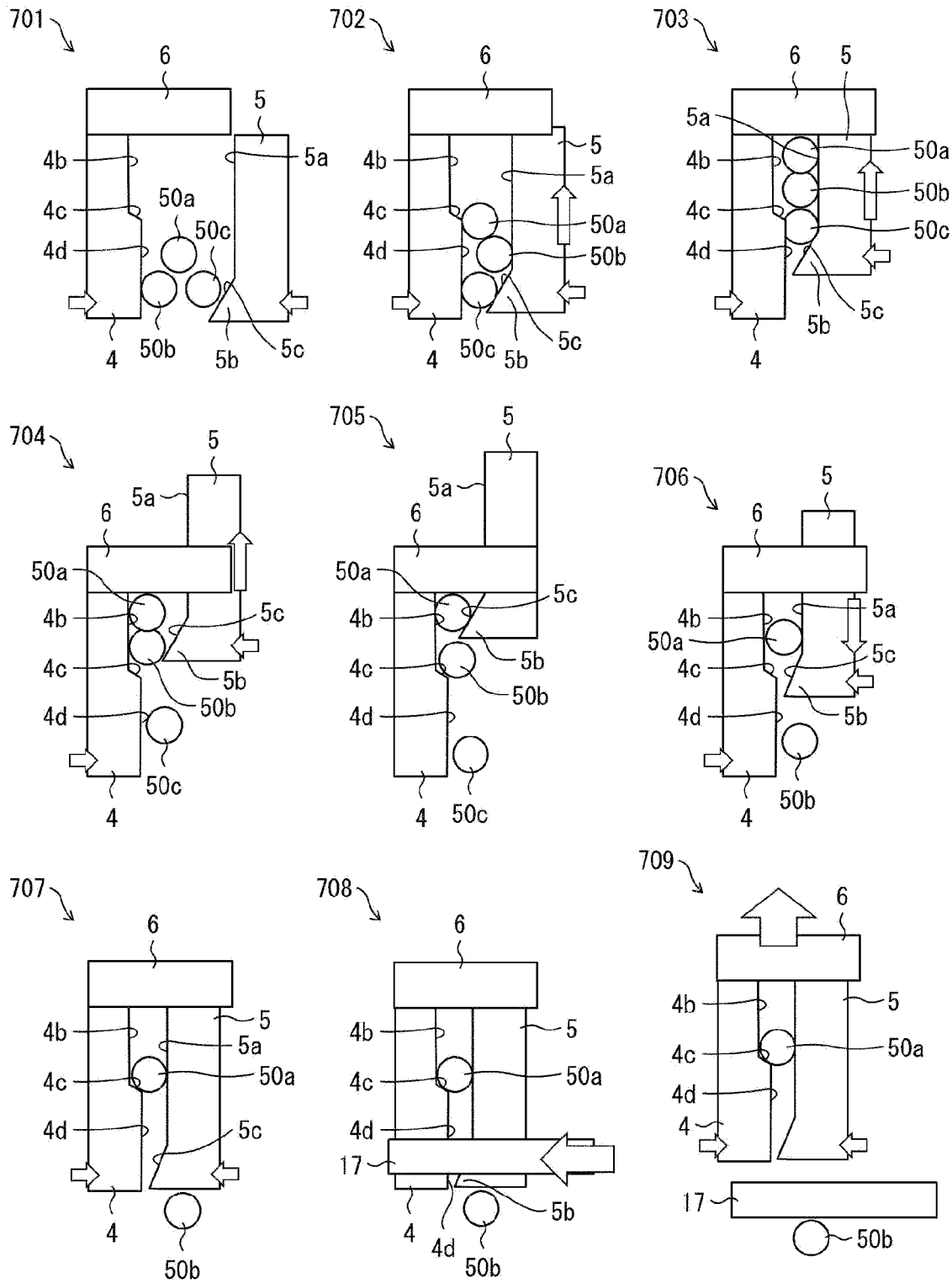
FIG. 11 is a schematic view illustrating another example of a flow of a series of operations of a linear member gripping device according to one embodiment of the present invention.

In the following, an example of operation of the linear member gripping device 1B including the insertion member 17 is described with reference to FIG. 11. FIG. 11 is a schematic view illustrating another example of a flow of a series of operations of the linear member gripping device 1B according to the present embodiment. Here, in FIG. 11, the horizontal direction is taken as the first direction X, and the vertical up-down direction is taken as the second direction Y.

In an operation example in which the collected linear members have been supplied to the linear member gripping device 1B, since the operations illustrated in signs 701 to 707 of FIG. 11 are the same as the operations illustrated in signs 401 to 407 illustrated in FIG. 7, the description thereof will be omitted herein. As illustrated in sign 706 and the like in FIG. 11, the second gripping member 5 is driven in a direction departing from the limitation position. Then, after the second gripping member 5 has been driven in the direction in which the protrusion 5b departs from the limitation position, the second gripping member 5 is driven vertically downward. That is, the second drive part 3 drives the relative positions of the first gripping member 4 and the second gripping member 5 in the direction in which the protrusion 5b departs from the limitation position. After that, the insertion member 17 is inserted into a predetermined position on the root side (upward direction) of the protrusion 5b at the moment after the driving (sign 708). After that, the second drive part 3 lifts the first gripping member 4 and the second gripping member 5 vertically upward, causing the one linear member that is being gripped to move to a place of the next process (sign 709).

Here, if the insertion member 17 is not inserted when a linear member (linear member to be gripped) indicated by 50a and a linear member (linear member not to be gripped) indicated by 50b get entangled, in the step of sign 709, the linear member indicated by 50b may also be lifted and moved. In contrast, by inserting the insertion member 17 into the predetermined position as described above, it can be prevented that the linear member that is not to be gripped may be lifted and moved together with the linear member that is to be gripped.

In § 2 and § 4, an example is illustrated in which the second gripping member 5 is driven toward the second direction Y. However, a method for driving the first gripping member 4 and the second gripping member 5 is not limited thereto. For example, an operation may be performed in which, by fixing the second gripping member 5 and driving the first gripping member 4 toward the second direction Y, one linear member is gripped from among multiple linear members. An operation may be performed in which, by driving the first gripping member and the second gripping member respectively toward the second direction Y, one linear member is gripped from among multiple linear members.

In § 2 and § 4, an operation example is illustrated in which, by driving the first gripping member 4 and the second gripping member 5 toward the first direction X so as to approach each other, multiple linear members are gripped. However, a method for driving the first gripping member 4 and the second gripping member 5 is not limited thereto. For example, an operation may be performed in which, by fixing the first gripping member 4 and driving only the second gripping member 5 toward the first direction X, multiple linear members are gripped. An operation may be performed in which, by fixing the second gripping member 5 and driving only the second gripping member 5 toward the first direction X, multiple linear members are gripped.

Further, in § 2 and § 4, an operation example is illustrated in which, by driving the second gripping member 5 toward the second direction Y, one linear member is left from multiple linear members. However, the driving direction for releasing multiple linear members from the two gripping members is not limited to the second direction. Specifically, in the linear member gripping device illustrated in FIG. 2 and the like, the first gripping member and the second gripping member are provided so as to extend in the vertical up-down direction. In contrast, the first gripping member and the second gripping member may be provided so as to extend in the horizontal direction so that multiple linear members are released from the two gripping members in the first direction X.

[Conclusion]

A linear member gripping device according to one aspect of the present invention includes: a first gripping member, having a first gripping surface that abuts a linear member to be gripped; a second gripping member, having a second gripping surface that abuts the linear member and faces the first gripping surface, and having a protrusion protruding toward the first gripping surface from the second gripping surface; a first drive part, changing relative positions of the first gripping member and the second gripping member in a first direction being a direction in which the first gripping member and the second gripping member approach or depart from each other, and a second drive part, changing the relative positions of the first gripping member and the second gripping member in a second direction perpendicular to the first direction; and a limitation part, limiting movement of the linear member sandwiched between the first gripping member and the second gripping member toward the second direction at a predetermined limitation position.

According to the aforementioned configuration, after the first gripping member and the second gripping member driven by the first drive part and the second drive part have gripped multiple linear members, by further driving each gripping member by each drive part, one of the linear members can be gripped by the first gripping member, the second gripping member, and the limitation part. Therefore, a device capable of reliably gripping a single linear member is realized.

In one embodiment, in the linear member gripping device, after the first drive part drives the relative positions of the first gripping member and the second gripping member to approach each other, the second drive part drives the relative positions of the first gripping member and the second gripping member so that the protrusion approaches the limitation position.

According to the aforementioned configuration, the first gripping member and the second gripping member can be driven so as to reduce the number of the multiple linear members gripped and leave only one linear member sandwiched between the first gripping member and the second gripping member.

In one embodiment, after the second drive part drives the relative positions of the first gripping member and the second gripping member so that the protrusion approaches the limitation position, the second drive part drives the relative positions of the first gripping member and the second gripping member in a direction in which the protrusion departs from the limitation position.

According to the aforementioned configuration, a distance between the linear member gripped by the first gripping member and the second gripping member and another linear member that is not gripped can be increased.

In one embodiment, in the linear member gripping device, the first gripping surface includes a root side gripping surface, a tip side gripping surface, and a step surface connecting the root side gripping surface and the tip side gripping surface. A distance between the root side gripping surface and the second gripping surface is larger than a distance between the tip side gripping surface and the second gripping surface.

According to the aforementioned configuration, since the first gripping surface has the step surface, by fitting the linear member to the step surface and the second gripping surface, movement of the linear member can be limited.

In one embodiment, in the linear member gripping device, when the linear member contacts the first gripping surface and the protrusion, a straight line from a center point in a section of the linear member to a contact point between the first gripping surface and the linear member and a straight line from the center point to a contact point between the protrusion and the linear member form an angle greater than 90 degrees and less than 180 degrees.

According to the aforementioned configuration, movement of the linear member associated with the movement of the linear member can be limited.

In one embodiment, when the linear member contacts the second gripping surface and the step surface, a straight line from a center point in a section of the linear member to a contact point between the second gripping surface and the linear member and a straight line from the center point to a contact point between the step surface and the linear member form an angle greater than 90 degrees and less than 180 degrees.

According to the aforementioned configuration, movement of the linear member associated with the movement of the linear member can be limited.

In one embodiment, after the second drive part drives the relative positions of the first gripping member and the second gripping member in the direction in which the protrusion departs from the limitation position, the first gripping member and the second gripping member gripping the linear member move toward a root side in the second direction.

According to the aforementioned configuration, the linear member gripped by the first gripping member and the second gripping member can be pulled up from the linear member gripping device.

In one embodiment, an insertion member is further provided that is inserted into a predetermined position on the root side of the protrusion at a moment when the second drive part has driven the relative positions of the first gripping member and the second gripping member in the direction in which the protrusion departs from the limitation position.

According to the aforementioned configuration, by inserting the insertion member into the predetermined position, it can be prevented that the linear member that is not to be gripped may be lifted and moved together with the linear member that is to be gripped.

In one embodiment, a recognition part is further provided that recognizes the number of the linear member gripped by the first gripping surface and the second gripping surface.

According to the aforementioned configuration, by recognizing the number of the linear member gripped by the first gripping surface and the second gripping surface, a device capable of reliably gripping one linear member is realized.

In one embodiment, the recognition part detects a distance between the first gripping surface and the second gripping surface, and recognizes the number of the linear member based on the distance detected.

According to the aforementioned configuration, the number of the linear member can be recognized based on the distance between the first gripping surface and the second gripping surface that is relatively easy to detect.

The present invention is not limited to the embodiments described above, and may be modified in various ways within the scope of the claims. An embodiment derived from a proper combination of technical means disclosed in respective different embodiments is also encompassed in the technical scope of the present invention.

What is claimed is:

1. A linear member gripping device, comprising:
   a first gripping member, having a first gripping surface that abuts a linear member to be gripped;
   a second gripping member, having a second gripping surface that abuts the linear member and faces the first gripping surface, and having a protrusion protruding toward the first gripping surface from the second gripping surface;
   a first drive part, changing relative positions of the first gripping member and the second gripping member in a first direction being a direction in which the first gripping member and the second gripping member approach or depart from each other, and a second drive part, changing the relative positions of the first gripping member and the second gripping member in a second direction perpendicular to the first direction;
   a limitation part, limiting movement of the linear member sandwiched between the first gripping member and the second gripping member toward the second direction at a predetermined limitation position; and
   an insertion member, configured to be inserted into a predetermined position on a root side of the protrusion at a moment when the second drive part has driven the relative positions of the first gripping member and the second gripping member gripping the linear member in a direction in which the protrusion departs from the predetermined limitation position, the root side being a side close to the limitation part in the second direction.

2. The linear member gripping device according to claim 1, wherein
   after the first drive part drives the relative positions of the first gripping member and the second gripping member to approach each other,
   the second drive part drives the relative positions of the first gripping member and the second gripping member so that the protrusion approaches the limitation position.

3. The linear member gripping device according to claim 2, wherein
   after the second drive part drives the relative positions of the first gripping member and the second gripping member so that the protrusion approaches the limitation position, the second drive part drives the relative positions of the first gripping member and the second gripping member in a direction in which the protrusion departs from the limitation position.

4. The linear member gripping device according to claim 3, wherein
   after the second drive part drives the relative positions of the first gripping member and the second gripping member in the direction in which the protrusion departs from the limitation position, the first gripping member and the second gripping member gripping the linear member move toward the root side in the second direction.

5. The linear member gripping device according to claim 1, wherein
   the first gripping surface comprises a root side gripping surface, a tip side gripping surface, and a step surface connecting the root side gripping surface and the tip side gripping surface;
   a distance between the root side gripping surface and the second gripping surface is larger than a distance between the tip side gripping surface and the second gripping surface.

6. The linear member gripping device according to claim 5, wherein
   when the linear member contacts the second gripping surface and the step surface, a straight line from a center point in a section of the linear member to a contact point between the second gripping surface and the linear member and a straight line from the center point to a contact point between the step surface and the linear member form an angle greater than 90 degrees and less than 180 degrees.

7. The linear member gripping device according to claim 1, wherein
   when the linear member contacts the first gripping surface and the protrusion, a straight line from a center point in a section of the linear member to a contact point between the first gripping surface and the linear member and a straight line from the center point to a contact point between the protrusion and the linear member form an angle greater than 90 degrees and less than 180 degrees.

8. The linear member gripping device according to claim 1, further comprising a recognition part recognizing number of the linear member gripped by the first gripping surface and the second gripping surface.

9. The linear member gripping device according to claim 8, wherein
   the recognition part detects a distance between the first gripping surface and the second gripping surface, and recognizes the number of the linear member based on the distance detected.

* * * * *